(12) United States Patent
Phinney

(10) Patent No.: US 6,582,637 B1
(45) Date of Patent: *Jun. 24, 2003

(54) COMPOST GRANULATION METHOD

(75) Inventor: Robin Phinney, Calgary (CA)

(73) Assignee: Agronomic Growth Industries Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,534

(22) Filed: May 5, 2000

Related U.S. Application Data

(60) Provisional application No. 60/132,569, filed on May 5, 1999, and provisional application No. 60/132,681, filed on May 5, 1999.

(51) Int. Cl.[7] .............................. B29B 9/08; C05F 9/04; C05F 11/00
(52) U.S. Cl. ...................... 264/117; 264/128; 71/64.02; 71/64.05; 71/64.06
(58) Field of Search .............................. 264/117, 128; 23/313 P; 71/64.02, 64.05, 64.06

(56) References Cited

U.S. PATENT DOCUMENTS

| | | | |
|---|---|---|---|
| 2,741,545 A | 4/1956 | Nielsson | 23/259.1 |
| 3,206,528 A | 9/1965 | Coombs et al. | 264/117 |
| 3,295,950 A | 1/1967 | Blouin et al. | 71/64 |

(List continued on next page.)

FOREIGN PATENT DOCUMENTS

| | | | |
|---|---|---|---|
| CA | 1309269 | 10/1992 | 71/47 |
| CA | 2214145 | 9/1996 | C05C/3/00 |
| CA | 2151569 | 12/1996 | B01J/2/30 |
| EP | 0289074 A1 | 11/1988 | C05C/13/00 |
| EP | 0748651 A1 | 12/1996 | B01J/2/14 |
| GB | 1383110 | 2/1975 | C07C/126/08 |
| JP | 09268089 A | * 10/1997 | |
| WO | WO97/39826 | 10/1997 | B01J/2/14 |

OTHER PUBLICATIONS

Solterra Minerals Inc., product brochure, approx. 1993.
Sulchem, product brochure, undated.

*Primary Examiner*—Stephen J. Lechert, Jr.
(74) *Attorney, Agent, or Firm*—Paul S. Sharpe; Ogilvy Renault

(57) ABSTRACT

Method of granulating compost for the formulation of fertilizers. In one embodiment, the compost is ground to dust and pan granulated. A variety of ancillary materials may be incorporated into the compost mix for a wide range of possible applications. An embodiment is provided where agricultural seeds may be encapsulated in compost to enhance the quality of seed and reduce wastage during planting.

8 Claims, 3 Drawing Sheets

U.S. PATENT DOCUMENTS

| | | | |
|---|---|---|---|
| 3,342,578 A | 9/1967 | Harshman et al. | 71/29 |
| 3,348,938 A | 10/1967 | Sherrington et al. | 71/28 |
| 3,408,169 A | 10/1968 | Thompson et al. | 23/313 |
| 3,423,171 A | 1/1969 | Hoppe et al. | 23/121 |
| 3,429,657 A | 2/1969 | George et al. | 23/63 |
| 3,436,175 A | 4/1969 | Atwood et al. | 23/119 |
| 3,449,106 A | 6/1969 | Paden et al. | 71/13 |
| 3,528,767 A | 9/1970 | Garrett | 23/89 |
| 3,533,776 A | 10/1970 | Coates et al. | 71/28 |
| 3,536,475 A | 10/1970 | Trub | 23/313 P |
| 3,539,326 A | 11/1970 | Eiji Otsuka et al. | 71/28 |
| 3,578,399 A | 5/1971 | Boeglin | 23/121 |
| 3,617,243 A | 11/1971 | Neitzel | 71/63 |
| 3,622,575 A | 11/1971 | Ellul et al. | 71/29 |
| 3,635,691 A | 1/1972 | Earl | 71/59 |
| 3,656,891 A | 4/1972 | Chemtob | 23/59 |
| 3,687,639 A | 8/1972 | Barlow et al. | 23/300 |
| 3,711,254 A | 1/1973 | McGowan et al. | 23/313 |
| T909,003 I4 | 4/1973 | Hicks et al. | 260/555 |
| 3,728,438 A | 4/1973 | Nasyrov | 423/551 |
| 3,785,796 A | 1/1974 | Mann, Jr. | 71/28 |
| 3,808,051 A | 4/1974 | Schoenholz et al. | 134/2 |
| 3,825,414 A | 7/1974 | Lee et al. | 71/29 |
| 3,843,772 A | 10/1974 | Boeglin | 423/551 |
| 3,853,490 A | 12/1974 | Boeglin et al. | 23/313 |
| 3,928,015 A | 12/1975 | Siegel et al. | 71/28 |
| 3,967,930 A | 7/1976 | Sadan | 23/296 |
| 3,983,211 A | 9/1976 | Nasyrov et al. | 423/128 |
| 3,984,521 A | 10/1976 | Nasyrov et al. | 423/120 |
| 3,998,935 A | 12/1976 | Adams et al. | 423/552 |
| 4,045,543 A | 8/1977 | Sardisco | 423/482 |
| 4,102,968 A | 7/1978 | Caswell | 264/117 |
| 4,116,848 A | 9/1978 | Schoenholz et al. | 252/90 |
| 4,129,642 A | 12/1978 | Neitzel | 423/199 |
| 4,131,668 A | 12/1978 | Sasaki et al. | 264/40.4 |
| 4,142,885 A | 3/1979 | Heumann et al. | 71/28 |
| 4,174,382 A | 11/1979 | Menche | 423/552 |
| 4,175,943 A | 11/1979 | Jordaan et al. | 71/29 |
| 4,183,738 A | 1/1980 | Carmon | 71/50 |
| 4,215,100 A | 7/1980 | Sokolov et al. | 423/552 |
| 4,264,543 A | 4/1981 | Valenta | 264/37 |
| 4,268,492 A | 5/1981 | Sardisco et al. | 423/482 |
| 4,303,619 A | 12/1981 | Kobayashi et al. | 422/205 |
| 4,323,386 A | 4/1982 | Heggebo et al. | 71/35 |
| 4,330,319 A | 5/1982 | Bexton et al. | 71/28 |
| 4,334,906 A | 6/1982 | Young | 71/33 |
| 4,342,737 A | 8/1982 | Iwashita et al. | 423/522 |
| 4,344,747 A | 8/1982 | Henry | 425/140 |
| 4,353,852 A | 10/1982 | Tse | 264/37 |
| 4,371,481 A | 2/1983 | Pollock | 264/15 |
| 4,371,512 A | 2/1983 | Sardisco et al. | 423/551 |
| 4,372,872 A | 2/1983 | Backlund | 252/313 R |
| 4,385,920 A | 5/1983 | Dancy et al. | 71/36 |
| 4,389,356 A | 6/1983 | Higgins | 264/9 |
| 4,420,468 A | 12/1983 | Yamashita et al. | 423/482 |
| 4,436,710 A | 3/1984 | Miyazaki et al. | 423/552 |
| 4,451,439 A | 5/1984 | Maurel et al. | 423/55 |
| 4,528,039 A | 7/1985 | Rubin et al. | 134/2 |
| 4,533,536 A | 8/1985 | Bichara et al. | 423/551 |
| 4,554,004 A | 11/1985 | Bierman et al. | 71/29 |
| 4,554,151 A | 11/1985 | Worthington et al. | 423/551 |
| 4,562,058 A | 12/1985 | Dancy et al. | 423/551 |
| 4,588,573 A | 5/1986 | Worthington et al. | 423/552 |
| 4,589,904 A | 5/1986 | Harrison et al. | 71/61 |
| 4,610,715 A | 9/1986 | Monaldi et al. | 71/28 |
| 4,668,242 A | 5/1987 | Vitellaro et al. | 23/313 R |
| 4,707,347 A | 11/1987 | Vajna et al. | 423/552 |
| 4,743,287 A | 5/1988 | Robinson | 71/12 |
| 4,842,790 A | 6/1989 | Nunnelly | 264/117 |
| 4,943,308 A | 7/1990 | Vanmarcke et al. | 71/29 |
| 4,954,134 A | 9/1990 | Harrison et al. | 23/313 R |
| 5,043,007 A | 8/1991 | Davis | 71/80 |
| 5,108,481 A | 4/1992 | Shutt | 71/61 |
| 5,112,379 A | 5/1992 | Young | 71/31 |
| 5,124,104 A | 6/1992 | Holley | 264/113 |
| H1070 H | 7/1992 | Harrison et al. | 23/313 R |
| 5,152,821 A | 10/1992 | Walter | 71/33 |
| 5,177,008 A | 1/1993 | Kampen | 435/139 |
| 5,177,009 A | 1/1993 | Kampen | 435/139 |
| 5,264,017 A | 11/1993 | Van de Walle | 71/61 |
| 5,298,050 A | 3/1994 | McLaughlin et al. | 71/63 |
| 5,322,532 A | 6/1994 | Kurtz | 51/293 |
| 5,330,552 A | 7/1994 | Rizzo | 71/30 |
| 5,352,265 A | 10/1994 | Weston et al. | 71/29 |
| 5,366,534 A | 11/1994 | Fischbein et al. | 71/63 |
| 5,378,259 A | 1/1995 | Bassetti et al. | 71/59 |
| 5,383,951 A | 1/1995 | Cross et al. | 71/61 |
| 5,460,765 A | 10/1995 | Derdall et al. | 264/117 |
| 5,529,764 A | 6/1996 | Lampert et al. | 423/552 |
| 5,549,876 A | 8/1996 | Zisner et al. | 423/199 |
| 5,552,126 A | 9/1996 | Efraim et al. | 423/199 |
| 5,567,221 A | 10/1996 | Larson et al. | 71/28 |
| 5,571,303 A | 11/1996 | Bexton | 71/34 |
| 5,599,373 A | 2/1997 | Zanuccoli | 71/21 |
| 5,603,745 A | 2/1997 | Pettersen et al. | 71/58 |
| 5,624,649 A | 4/1997 | Gal | 423/243.11 |
| 5,725,630 A | 3/1998 | Roberts et al. | 71/11 |
| 5,766,302 A | 6/1998 | Lefroy et al. | 71/28 |
| 5,849,060 A | 12/1998 | Diping et al. | 71/64.07 |
| 6,013,209 A | 1/2000 | Phinney | 264/37.29 |
| 6,013,216 A | 1/2000 | Watanabe et al. | 264/117 |
| 6,030,565 A * | 2/2000 | Golan | 264/117 |
| 6,132,484 A * | 10/2000 | Phinney | 71/31 |
| 6,331,193 B1 * | 12/2001 | Phinney | 23/313 P |

* cited by examiner

COMPOST GRANULATION METHOD

This application claims the benefit of U.S. Provisional Patent Application Nos. 60/132,569 filed May 5, 1999 and 60/132,681 filed May 5, 1999.

FIELD OF THE INVENTION

The present invention relates to granulation of compost materials and more particularly, the present invention relates to a method of producing high quality granulated compost and multiple component compost granules for fertilizer applications.

BACKGROUND OF THE INVENTION

The granulation art is a mature art and recently significant advances have been made by Derdall et al., U.S. Pat. No. 5,460,765, issued Oct. 24, 1995 and subsequently by Phinney in U.S. Pat. No. 6,013,209, issued Jan. 11, 2000.

With reference to Derdall et al., this disclosure provided teachings which advanced this art by demonstrating that an ultra fine powder (−200 mesh) does not cause nucleation of the powder, but rather results in adhesion of the material to large round pellets. This process is not unlike the proverbial growth of a snowball. The technique invented by Derdall et al. clearly provides excellent process control needed to effectively maximize the contact of fine particles with binder. As a result, binder additions of 5% and less are routinely used where the previous art required approximately double this amount. As is evident, if the amount of binder can be reduced, the amount of feedstock in the particle can be increased, which, in turn, provides an improved pellet or granule.

The Derdall et al. process established that a large significant crystal or seed is critical to perform the granule formulation in one step. Although this is a significant advance in the art, it does not contemplate granulation of materials directly on the pan. If a mixture of material which contains the feedstock to be granulated and moisture is provided in a pre-moistened mixture, there is effectively no seed or nucleating agent present. This material is then used directly on the pan containing the powdered feedstock to facilitate growth of a granule.

Derdall et al. advanced the granulation art significantly by demonstrating that powdered material could be granulated, provided a seed material was used as an initiator to grow the particle. Prior to the efforts by Applicant, Derdall et al. effectively taught the state-of-the-art and is an extremely useful process when seed material can be used to form a granule. Such granules have obvious cores in the center of the granule.

In the art, it has been generally recognized that any particle greater than +150 mesh and −100 mesh causes over-nucleation on the pan which inevitably leads to the particles sticking together in agglomerated groups. This led to the conclusion that in order to make a strong enough pellet a binder must be present in an amount generally between 4% to 10% in order to effect proper adhesion of the materials into a consolidated particle.

The Derdall et al. reference clearly teaches that there are stability problems with the process if one uses a seed which exceeds certain size parameters. In summary, Derdall et al. was the first to provide a process for granulating powdered material.

Turning to the Phinney disclosure, an advance over what was initially demonstrated in Derdall et al., was provided. In the Phinney patent, it was found that if one were to use a nucleating agent, which is effectively a powder in the size range of −35 mesh to 150 mesh, a seed could be grown and composed of the same material of the final product in a size distribution of approximately −8 mesh to +4 mesh. The distinction between Derdall et al. and the Phinney patent resides in the fact that Phinney recognized that a seed was not initially required to effect granulation; the seed could be formulated by using an initial nucleating material in a powder form to first formulate a seed which could be later grown in further granulation operations. This resulted in significant advantages in terms of the final product quality. One of the chief advantages is directed to particle strength and uniform material accretion about the seed. In view of the fact that the nucleating material used was effectively infinitesimally small, the Phinney granules effectively had no core relative to the particles produced by the Derdall et al. method. In this manner, the particles produced according to the Phinney methodology provide particles having a uniformed and uninterrupted cross-section. Accordingly, a higher feedstock content could be included in each granule or pellet.

The Phinney and Derdall et al. references have provided significant instruction in the granulation art with respect to materials having fairly high bulk density. In the case of these references, sulfur has been illustrated as an example that could be granulated. Sulfur has a fairly high bulk density, approximately of the order of between 30 and 35 pounds per cubic foot ($lbft^{-3}$). This bulk density presents a particle size of between about 180 mesh and 300 mesh. At this bulk density, there is sufficient mass to permit the granulation of the product. It has been found that this is not the case with all materials and problems can arise when the bulk density drops from the value indicated for sulfur to, for example, compost. The granulation of compost material presents unusual complications. Compost material, when pulverized, is extremely lightweight, hydrophobic and the individual particles repel one another by electrostatic interaction. The bulk density of compost is approximately between 20 $lbft^{-3}$ to about 25 $lbft^{-3}$, which corresponds to a particle size of generally between about 240 mesh to about 400 mesh. This powder level, taken together with the properties of compost, the techniques established in the prior art and particularly, the Derdall et al. and Phinney references, require modification under certain circumstances to effect granulation of this valuable agronomic compound.

The proposition of granulating compost has been proposed in the prior art as has the concept of coating or otherwise encapsulating seeds for the protection of the seed until such time that it is desired for this to germinate.

Typical of the prior art in this area includes the process set forth in U.S. Pat. No. 3,905,796, issued September 1975, to Ghelfi. The disclosure teaches a process for dehydrating manure based fertilizers where a homogenous and durable pulp is granulated and dried.

U.S. Pat. No. 4,082,532, issued to Imhof, Apr. 4, 1978, discloses a process for manufacturing extruded cattle manure pellets where the cattle manure is mixed into a pulp and contains a moisture content between 50 to 55% by weight. The material is extruded to form strands which are subsequently further broken down into smaller forms. In this reference and the above-mentioned reference, there is no discussion as to the use of further agricultural additives to the compost and very few details concerning the granulation. It has been discovered in the instant application that once the compost material has been dried and pulverized, it is difficult to wet this material in the absence of a surfactant.

The references discussed thus far do not touch on this issue whatsoever and only provide generic teachings with respect to the granulation.

Davis, in U.S. Pat. No. 5,043,007, provides a process for the production of fertilizer or the fertilizer is binder free fertilizer. The disclosure provides for a seed material and a primary and secondary nutrient sources which are put into a blender under heat until the slurry is formed. The slurry is transferred to a dryer and the product dried under vacuum and thereafter cooled to produce a granular or semi-granular fertilizer with a core of a seed material and a coating of a secondary nutrient crystallized thereabout.

In U.S. Pat. No. 5,725,630, issued to Roberts et al., Mar. 10, 1998, a fertilizer plant is set forth as well as a dry granular fertilizer. The granular fertilizer contains a C1–C6 alkanoic acid or salt of this-compound added on to a dry carrier form of granular fertilizer. This is a simple coating process and does not provide a granule having ancillary or auxiliary fertilizer compounds granulated uniformly therein.

Turning to additional prior art in the fertilizer/seed encapsulation field, U.S. Pat. No. 4,779,376, issued to Redenbaugh, Oct. 25, 1998, discloses an encapsulation method for a botanical seed where the seed is encapsulated in a water saturated hydrogel capsule.

Johnson et al., in U.S. Pat. No. 3,648,409, issued Mar. 14, 1972, discloses a herbicide resistant carrier process for manufacturing the product. There is disclosed a method and a herbicide resistant wafer encases a seed and a mixture of water soluble nutrient binder vermiculite and activated charcoal, which is subsequently compressed into a desired shape, in this case, a wafer.

Other references generally related to seed coating or encapsulation include U.S. Pat. Nos. 4,759,151, 5,849,320, 3,950,891, 3,905,152, 5,435,821 and 3,651,772.

The prior art when taken singly or in combination does not provide specific teaching for the granulation of compost powder material which may include auxiliary fertilizers, time release materials, or other suitable additives well known in the granulation art. Further, the fact that there is no teaching with respect to the granulation of the compost, it is also submitted that the art reviewed fails to provide a granulated product having a seed encapsulated therein while still maintaining desirable properties such as roundness, particle break strength, rate of salvation, etc. It would be desirable to have a method as well as a product directed to enhancing the fertilization of soils where the fertilizer consists of compost material in a powdered form at the −150 mesh level or less which may be co-granulated with additional fertilizer materials such as some of the known fertilizers discussed hereinafter without the problem of the hydrophobicity of the compost powder. The present invention satisfies these needs as well as others.

SUMMARY OF THE INVENTION

One object of the present invention is to provide an improved method for granulating compost powder in the absence of a nucleating material, seeding material, or other initiator. A further object of one embodiment of the present invention is to provide a method of encapsulating, by granulation, agricultural seeds for the purpose of encapsulating the seed.

One object of the present invention is to provide a method of granulating compost material, comprising the steps of:

providing a source of dried pulverized compost material in a size distribution of 90% of less than −150 mesh;

forming a moist mixture of dried pulverized compost and binder containing moisture, the mixture containing up to 11% by weight moisture in the mixture;

mixing the mixture sufficiently to invert the hydrophobicity of the pulverized compost material, where the pulverized compost material absorbs the moisture from the binder and forms a flowable compound;

granulating the mixture into granules on the pan by contact of the mixture with additional binder material and a surfactant; and forming compost granules in a size distribution of 3 mesh to 12 mesh.

Advantageously, the compost is sterilized when heated and pulverized and, therefore, odor and pathogens are not a concern. This also allows the compost from any source to be used including animal, plant or combinations of these.

In view of the hydrophobicity of the powder compost, it has been found that by providing a free moisture content of up to 11% by weight on the pan that the process will be viable and produce granules. In this manner, it is an essential feature of the present case to include a surfactant to reduce the surface tension of the compost dust and thus allow granulation to occur directly on the pan in the absence of any nucleating material or other particle growth initiators. Suitable surfactants will be appreciated by those skilled in the art. This process embodiment is effective for granulating compost in a wide percentage by weight basis.

The art has established the use of a nucleating agent for granulating feedstock material under "dry" conditions. This was established in the Phinney U.S. patent discussed supra. Reference to this type of condition was also made in the Derdall et al. patent. In further advances made by Phinney, and particularly those set forth in PCT Publication, PCT/CA 99/00300, (International Publication No. WO 99/54029 published on Oct. 28, 1999), it was established that pan granulation could be effected by simply providing a wet mixture (a mixture containing moisture, feedstock and surfactant) and contacting this wet mixture with feedstock within the pan. This resulted in the formation of granules directly on the pan in the absence of a nucleating agent or seed. In this manner, the granulation could be effected by eliminating the step of formulating a seed.

As briefly discussed hereinabove, compost presents new complications for the process designer in view of the properties of the compost. The bulk density has been mentioned above as well as the other properties which complicate granulation procedure. In view of the properties, direct pan granulation such as that established in the PCT publication is not convenient. Considering the other existing dry methodology, particularly pre-formulation of a seed by a nucleation unit operation, this also is unsatisfactory in view of the properties of the compost. The material is not conducive to the preparation of a nucleating material in view of the size distribution of such agents. This is partly due to the fact that pulverized compost presents the hydrophobicity problem as well as the electrostatic interaction complication. Simply by these properties, a material that is inherently self-repulsive and hydrophobic, cannot effectively be granulated into a pellet as a nucleating material and most certainly not as a seed with the ultimate goal of generating a granule acceptable in the marketplace.

In the instant case, the full recognition of the compost properties together with extensive engineering experience have been combined to overcome the inherent complications with compost granulation. It is well accepted that the Derdall et al. method as well as the Phinney method have resulted in significant advances in the art. Despite this, neither method is particularly well suited to the granulation of compost, since these references were primarily concerned with the granulation of higher bulk density materials having further properties different from compost.

In the case where it would be desirable to form a granule of a larger size for a particular use, a multiple phase granulation process may be followed. Larger granules are applicable in the golf course fertilizer industry. It is desirable to have larger granules for time release purposes. As it has been established in the art by Derdall et al. and Phinney, the material being granulated on the pan will equilibrate at a certain size distribution, depending on pan rotation velocity, pan tilt and pan pitch among a host of other factors. As such, there is a need, under certain circumstances, to employ a second pan for further material accretion.

Accordingly, in accordance with a further object of one embodiment, there is provided a method of granulating compost material, comprising the steps of:

providing a source of dried pulverized compost material in a size distribution of 90% of less than −150 mesh;

forming a moist mixture of dried pulverized compost and binder containing moisture, the mixture containing up to 10% by weight moisture;

mixing the mixture sufficiently to invert the hydrophobicity of the pulverized compost material, where the pulverized compost material absorbs the moisture from the binder and forms a flowable compound;

granulating in a first stage the mixture into granules on the pan by contact of the mixture with additional binder material and a surfactant, the granules being in a size distribution of between 3 mesh and 12 mesh and including at least a fraction of particles in a size distribution of between 8 mesh and 12 mesh;

granulating the fraction of particles 8 mesh and 12 mesh in a second stage by contact with the mixture and additional binder; and forming compost granules in a size distribution of between −3 mesh and +8 mesh.

In some situations, it is desirable to have a fairly sizeable granule beyond that which is set forth in the above-captioned object. From a procedural point of view, the −3 mesh to +8 mesh granules may be further grown to a size distribution of ½" or greater. This can be accomplished by making use of a drum granulator. Similar unit operations such as binder addition, surfactants, blending with the binder, would be observed in the drum to achieve ½" granule growth.

As it will be immediately appreciated to those skilled in the art, it does not matter the specific order of binder surfactant being added to the granulating pan, the point here is that the material on the pan must have an adequate supply of surfactant to effect granulation together with binder to adhere the compost mixture. In this manner, the binder surfactant may be mixed and added to create up to 11% by weight moisture content or these may be added simultaneously separately. Variations, again, will be appreciated by those skilled in the art.

As a further application, the technology set forth herein fits well with the encapsulation of agricultural seed material and accordingly, a further object of the present invention according to a further embodiment is to provide a method of encapsulating an agronomic seed with compost material into a granulated pellet, comprising the steps of:

providing a source of dried and pulverized compost material, pulverized to dust in a size distribution of 90% of less than −150 mesh;

providing a source of agronomic seeds;

forming a moist mixture of dry pulverized compost and binder containing moisture, the mixture containing up to 11% by weight moisture;

mixing the mixture sufficiently to invert the hydrophobicity of the pulverized compost material, where the pulverized compost material absorbs the moisture from the binder and forms a flowable compound;

providing a granulation pan;

contacting the pan with the agronomic seeds;

contacting the pan with the mixture; and granulating the mixture about the seeds on the pan by contact of the mixture with the seeds; and forming pellets of encapsulated agronomic seeds with compost.

Any seed material could be encapsulated. Examples of suitable seeds which would particularly benefit from encapsulation are the light seeds that typically are air dropped including canola seeds, canary, rape seeds, inter alia. This is problematic since the seeds, being fairly light are often blown off course relative to their intended location and this adds significant costs to the farmer. Further, in many countries "broadcasting" of seeds is now becoming an unpopular procedure for planting crops. By encapsulating such seeds, mass is added, the seed is protected and there is inherent spacing afforded by the granulation material between seeds when planted. One of the particularly attractive features of seed encapsulation is that the compost material effectively acts as a fertilizer for the seed and thus provides a seed with its own fertilizer. Further, by the provision of adding further suitable fertilizer materials discussed herein, a most desirable product results.

Fertilizer salts cannot be placed too close to the seed. The osmotic pressure of these salts is too high and the seeds will not germinate. The 1-1-1-1 in compost is in humates which the plant readily receives without changing the osmotic pressure.

Advantageously, the methodology has resulted in greater than 30% of the granules containing a single seed. Further, encapsulation automatically provides the seed with nutrients and humates and considering the size of the particle (6 to 8 mesh) small seeds are not wasted during planting. The coating also ensures flowability of seeds that would otherwise not flow to permit greater ease in handling and transportation.

Typical over seeding costs for Canada could be as high as 50%. With seed costs of $500 per ton, a 50% saving is substantial. It is well known in farming that the seeds should have uniform spacing in order to maximize yields. Too many plants too close together reduces yields significantly. The present invention eliminates this wastage to provide a cost effective method of seeding.

In another application, the agronomic seed may be replaced by a suitable fertilizer material. Accordingly, a further object of another embodiment is to provide a method of granulating compost material, comprising the steps of:

providing a source of dried and pulverized compost material, pulverized to dust in a size distribution of 90% of less than −150 mesh;

providing a source of a fertilizer material as a seeding agent;

forming a moist mixture of dry pulverized compost and binder containing moisture, the mixture containing up to 11% by weight moisture;

mixing the mixture sufficiently to invert the hydrophobicity of the pulverized compost material, where the pulverized compost material absorbs the moisture from the binder and forms a flowable compound;

providing a granulation pan;

contacting the pan with the fertilizer material;

contacting the pan with the mixture; and granulating the mixture about the fertilizer material on the pan by contact of the mixture with the seeding agent; and forming pellets of encapsulated fertilizer material with compost.

A further object of one embodiment of the present invention is to provide a granulated compost granule, comprising:

an agronomic seed; and compost material granulated therearound.

An even further object of one embodiment of the present invention is to provide a composite granule, comprising:

a homogenous blend of compost and fertilizer.

A still further object of one embodiment of the present invention is to provide a composite compost granule, comprising:

a central fertilizer core; and compost material granulated therearound.

The advantages ascribable to the products formed in accordance with the methods are numerous and include the following:

a. the product is granulized dry;

b. particle size can be customized for specific uses;

c. transportation is greatly simplified relative to conventional compost;

d. the granules assist in soil moisture retention by building up humic content thus improving tolerance against drought while providing benefit to crop growth;

e. run-off is prevented together with concomitant nutrient loss;

f. soil exchange and buffering capacity are improved;

g. product is non-toxic and non-burning;

h. provides sustained long-term benefit to the soil as opposed to relatively short term benefit of chemical fertilizers;

i. provides a source of water insoluble nitrogen that is released over a long period of time;

j. provides the opportunity to combine both positive aspects of organic and inorganic fertilizer synergistic benefit in view of the co-granulation; and k. simplified application which is more precise and less wasteful relative to broadcasting.

A still further object of one embodiment of the present invention is to provide a composite granule, comprising:

an agronomic seed in a size distribution of between +35 mesh and −8 mesh;

composite material layered thereon forming a granule having a seed encapsulated therein in a size distribution of between 6 mesh and 8 mesh.

Having thus described the invention, reference will now be made to the accompanying drawings illustrating preferred embodiments.

BRIEF DESCRIPTION OF THE DRAWINGS

Similar numerals employed in the text denote similar elements.

PREFACE

Mesh referred to herein references Tyler standard screen scale. NPKS references nitrogen, phosphorous, potassium, sulfur, well recognized by those skilled in the agricultural engineering field. Percent content references a percentage by weight basis, unless otherwise indicated. Pan speed, angle and tilt may be variable and will depend on the design parameters required of the formed granules. Specific values are within the purview of one skilled.

DETAILED DESCRIPTION OF THE PREFERRED EMBODIMENTS

Prior to referring to the details of the invention, it is important to note that pan granulation of compost material, plant or animal, has previously not been proposed in view of the fact that when pulverized the material has an extremely low bulk density, generally of the order of approximately between 20 and 25 $lbft^{-3}$. To compound this, pulverized compost is quite hydrophobic, inherently resilient due to its fibrous nature and therefore difficult to compress and also is self-repulsive from an electrostatic point of view.

Having such a panacea of inherent complications, the pan granulation of compost material, particularly considering the bulk density, is not conducive to the formation of a pellet which will roll on the pan. Wetting, growth and consolidation of the materials is not trivial and reference to the prior art does not facilitate the process. It has been found through experimentation that if the bulk density of the compost can be increased sufficiently, a pellet will form and can be grown by accretion of further compost material or ancillary fertilizer compounds. A successful approach has been realized by the formation of a mixture having the pulverized compost material, a suitable surfactant and binder material. The surfactant contributes by lowering the surface tension of the compost thus allowing moisture, binder and further compost material to be mixed. Once mixed, the mixture can be granulated on a pan with the addition of further binder which may be composed of the same binder material in the mixture. The addition of further binder may be in the form of an aerosol application known in the art.

Figure 1:
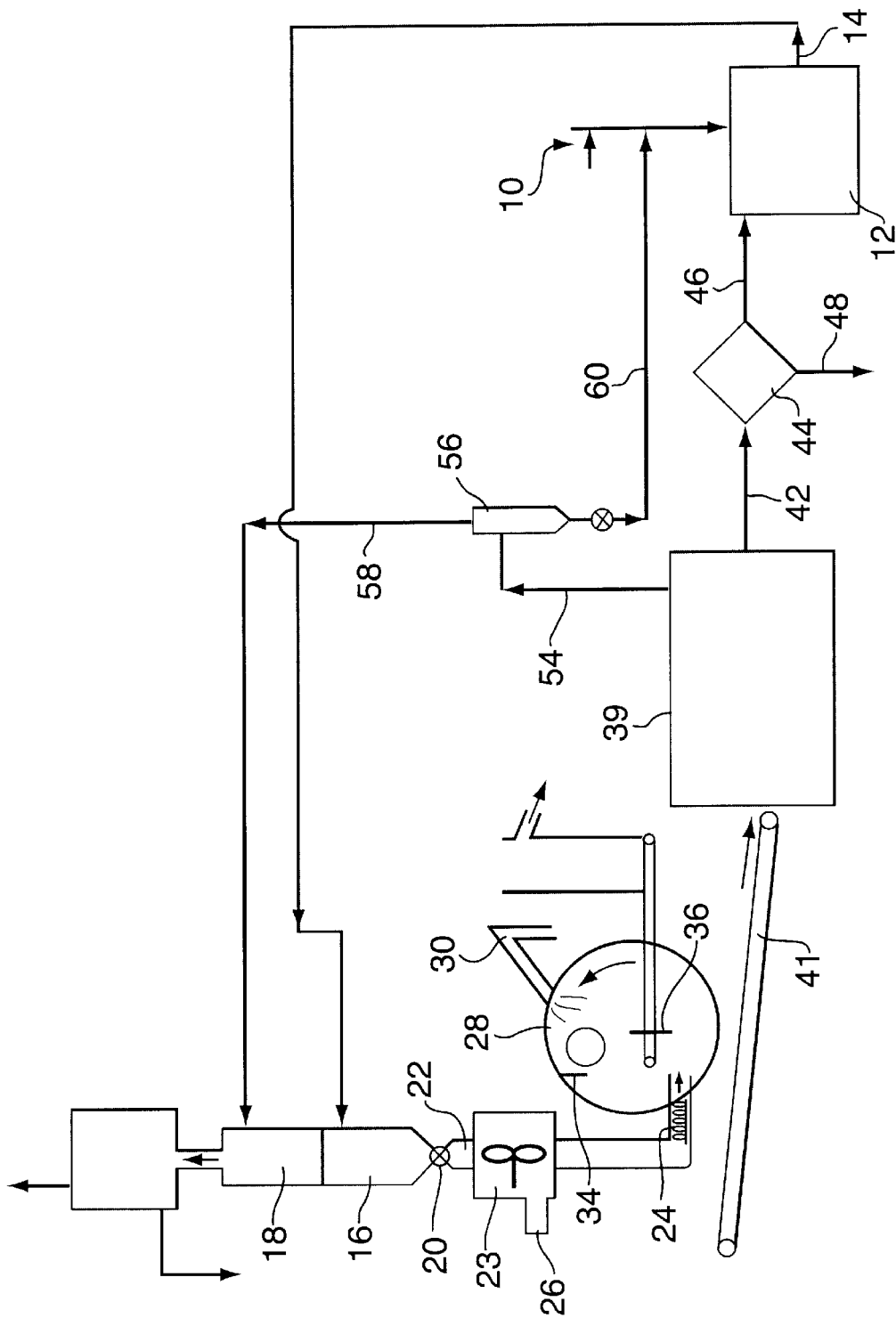
FIG. 1 is a schematic illustration of one process suitable for granulating the compost in accordance with one embodiment of the present invention.

As an example, the granulation may proceed in accordance with the procedure set forth with respect to FIG. 1.

Referring now to FIG. 1, shown is an overall schematic representation of a granulation procedure by which the compost granules may be formed.

Reference numeral 10 denotes the introduction of compost feedstock. The technology set forth herein permits the formation of most any compost granulated product including blends of various sulfates, soda ash, sulfur, potash, kaolin, magnesia, potassium sodium and ammonium chloride, phosphate compounds, blood meals, inter alia.

The compost feedstock and binder are introduced into a pulverizer 12 to pulverize the feedstock such that a product is produced having a size distribution of 96% less than −150 mesh. A significant portion is −200 mesh. The pulverizer 12 may be a classifying pulverizer or air sweep pulverizer or any other suitable pulverizer known by those skilled in the art. Once pulverized, the compost stream, generally represented by numeral 14, is introduced into a sealed collection hopper, globally denoted by numeral 16, which includes a bag house 18 to collect dust. Collection hopper 16 includes suitable valve 20 for metering dust into a collection bin 22. Bin 22 communicates with mixer 23 to mix in binder (approximately 58% solids).

In the example, a thick lignosulfonate solution was the binder used. After a short mixing time, the mixture was noted to develop suitable characteristics for granulating. The dried pulverized compost, normally hydrophobic, was observed to convert to a hydrophilic form since the moisture in the binder solution was "wicked" or transported into the compost and the binder solids dispersed within the powder mixture. This resulted in a significant increase in the bulk density to provide a flowable powder.

From mixer 23, the pre-moistened mixture is fed to feeder 24.

Moisture and surfactant may be added by suitable means known to those skilled with delivery denoted by numeral 26. The moisture content to be observed is up to 11% by weight of the mixture. This is not to be confused with bound hydrated water. This refers to free moisture content which is important to facilitate granulation. Once the correct moisture has been attained, the mixture is passed to pan granulator 28. In order to form the granules, additional binder and surfactant material is introduced by, for example, aerosol. The aerosol is dispensed by a suitable atomiser or wetting gun 30. The aerosol binder may comprise the same material as initially pulverized with the compost or alternatively, the binder may be a different material optionally including an ancillary fertilizer compound soluble in the binder solution.

As is known in the art, the pan granulator 28 includes upper and lower scrapers 34, 36, respectively. The use of the binder solution at any position from the 12 o'clock through to the 5 o'clock position has been found to be particularly useful. By making use of the surfactant to reduce the surface tension of the compost, which is inherently hydrophobic, the bulk density of the mixture can be increased and thus wetting, growth and consolidation can be achieved. Suitable surfactants include $C_4$–$C_8$ sulfonic acids, sulfonic acids, sodium succinate, inter alia. The surfactant may be mixed in with the binder or added to the pan. When the correct free moisture is attained, up to 11% by weight free moisture, the pan stabilizes at a steady state condition.

The product formed from pan 28 is typically between 3 mesh and 12 mesh. The product is discharged and dried with dryer 39. Dryer 39 may be selected from, for example, Carrier dryers, tray dryers or roto louver type dryers. The product formed in pan 28 is additionally transported to dryer 39 via a suitable conveyer, globally denoted by numeral 41.

Product exiting dryer 39 via stream 41 is then screened by a suitable screening arrangement 44 at 3 mesh, 8 mesh and 20 mesh. The –20 mesh portion is sent to pulverizer 12 for recycling into the system, the recycling stream being indicated by numeral 46. The oversize lumps are broken-up by a, for example, Fritz mill and are added to the pan feed or disposed of. The 3 to 12 mesh portion is the final product and leaves screen 44, as indicated by numeral 48, as a final finished product.

Any residual dust which may be present in dryer 39 may be passed via line 54 for exiting dryer 39 to hopper 56 and the collected material in hopper 56 either passed onto the bag house 18 via line 58 or passed into the feedstock via line 60. The fines or dust entering bag house 18 may additionally be passed off onto ancillary operations, for example, wet scrubbing. Other examples will be readily apparent to those skilled in the art.

With further reference to pan 28, as is known, the pan may be adjusted for angle and rotational speed. In addition, it has been found advantageous to not only change the horizontal disposition of the pan, but also to laterally tilt the pans to enhance the efficiency of the granulating process. The specific angle of tilt and horizontal angle will be dependent upon the rotational speed and the size of the granule desired to be produced.

Figure 2:
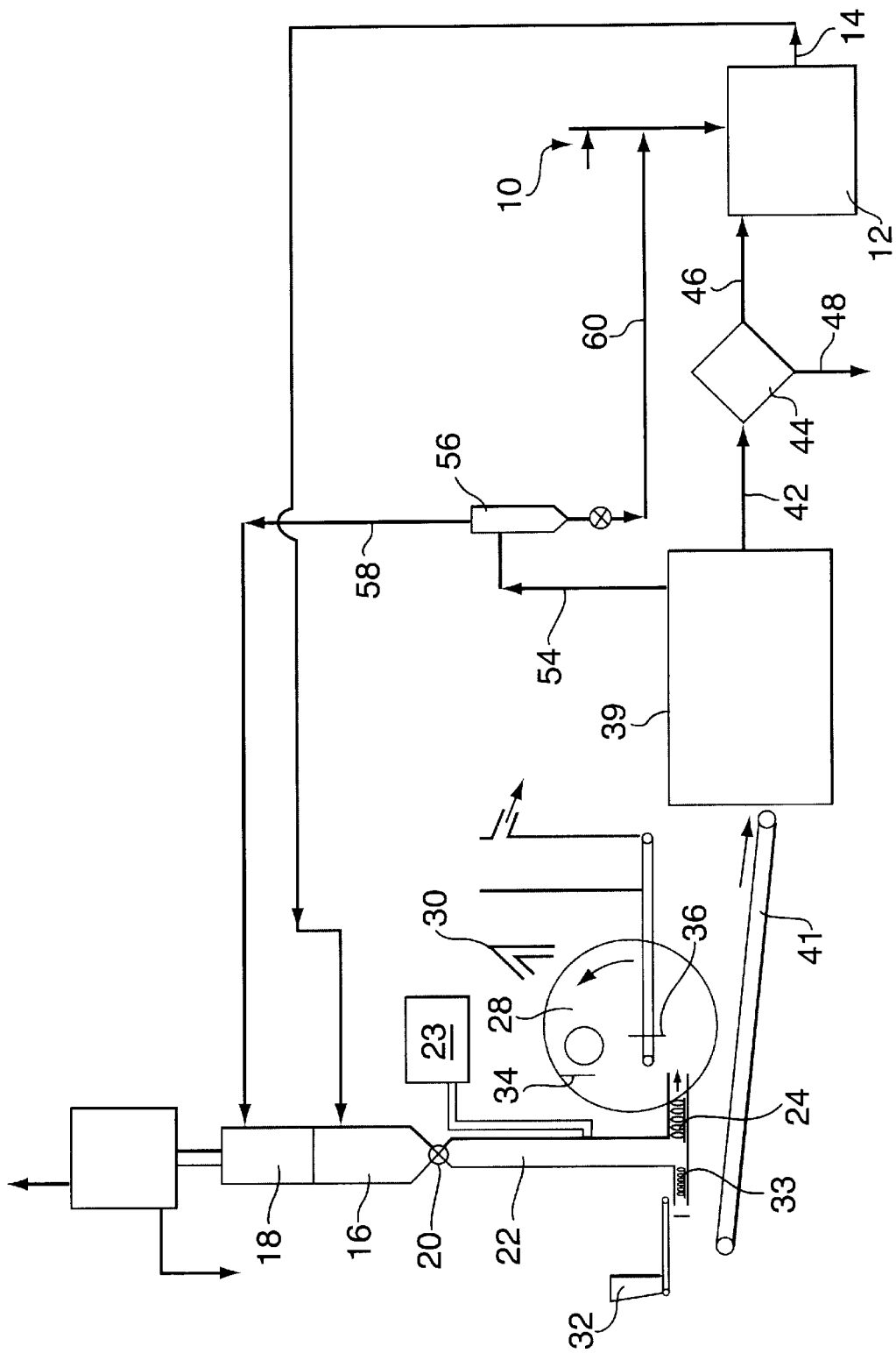
FIG. 2 is a schematic illustration of an alternative process useful for granulating the compost according to the present invention.

In respect of a second embodiment of the present invention, FIG. 2 schematically illustrates a further possible circuit.

In this embodiment, a hopper 32 is included in the circuit to retain a source of agronomic seeds such as canary seeds, rape seeds, canola seeds, etc. The seeds may be introduced by a feeder 33 for introduction onto pan 28. In this size distribution, a product can be formulated when an agronomic seed is encapsulated in compost. Typically, an industrially useful size distribution for such products is between 6 mesh and 8 mesh. The final product has been found to provide extremely useful results in that 30% of the encapsulated products contain a single seed. This percentage can be augmented to at least 90% by seed volume increase on the pan. This is particularly useful to industry in that wastage is minimized and over seeding is not a concern in view of the size of the final product. It is well established in the agricultural art that over seeding and inconsistent aerial coverage are major problems and result in excessive costs in the industry. Similar procedures from those described with respect to FIG. 1 are applicable. As an alternative, the hopper 32 may contain a fertilizer material such as ammonium sulfate etc., in a size distribution of between –35 mesh and +150 mesh and thus acts as a nucleating agent. This augments the granulation procedure to result in the formation of a composite compost granular having a central core of a fertilizer material. The compost material, as stated herein, may also contain a host of different materials.

Figure 3:
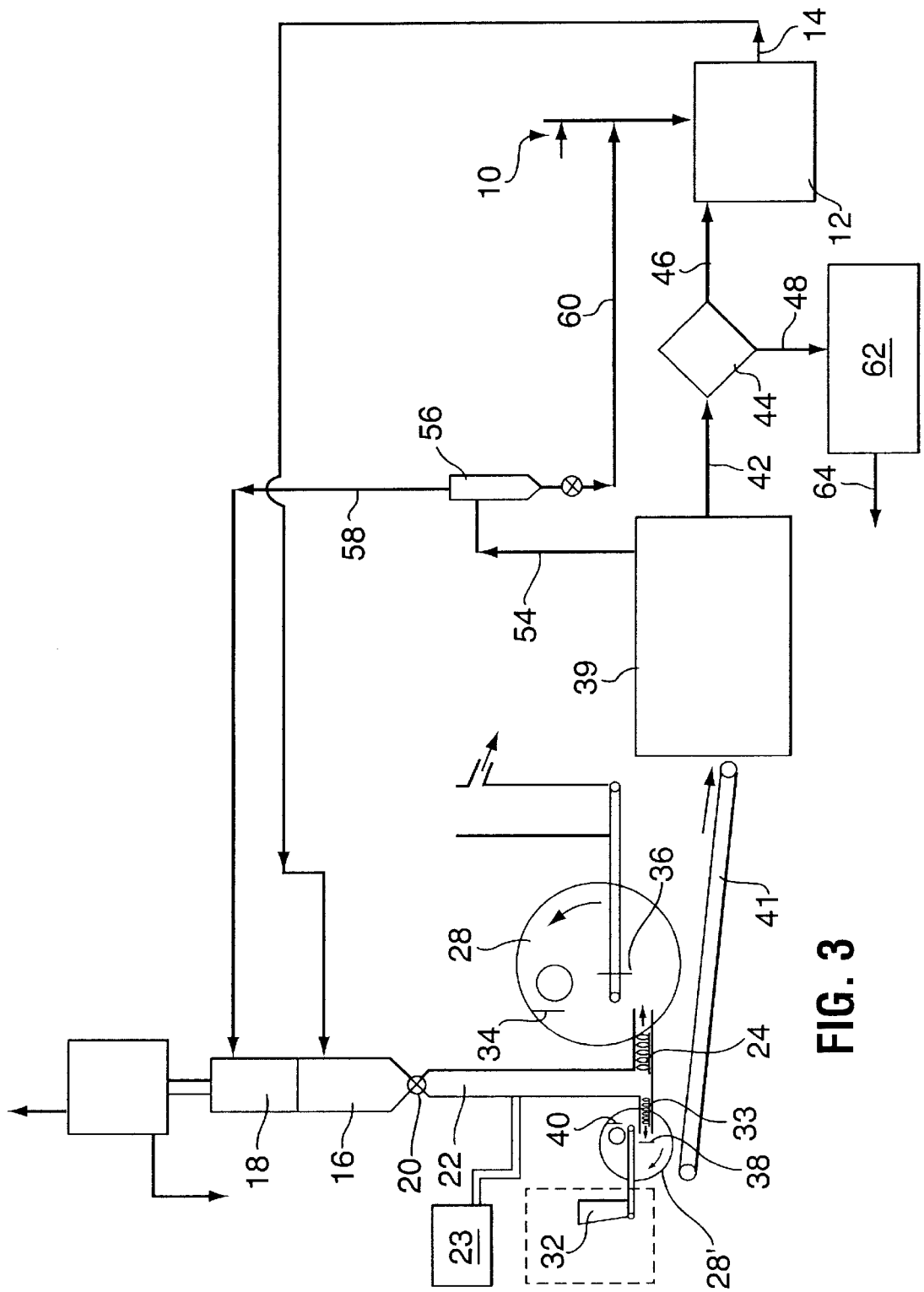
FIG. 3 is a schematic illustration of a further process useful for granulating the compost according to the present invention.

Referring now to FIG. 3, shown is a further embodiment of the present invention.

In this embodiment, two granulation pans are employed. Pans 28 and 28' cooperate to form a first stage granule and a second stage larger granule. The mixture, as discussed herein previously, is introduced to a small pan 28' to form a size distribution of between 3 mesh and 12 mesh with a fraction in a size distribution of between 8 mesh and 12 mesh. The mixture is fed to pan 28' by feeder 33. The pan 28' includes scrapers 38 and 40. The +8 mesh and 12 mesh particles are passed on to pan 28 and undergo treatment as established with respect to FIG. 1 until a size distribution of –3 mesh and +8 mesh is achieved. This size distribution may be altered further, if desired, by passing formed granules from 48 into a drum granulator 62 for further material accretion up to 0.5 inch pellets. The accretion in the drum substantially follows the procedure in the pan as set forth herein. As a further option, hopper 32 may be used in this circuit process.

It will also be readily appreciated that any number of pans can be incorporated into the system to progressively grow or accrete a granule. To this end, the process is interruptible and therefore can be custom designed to produce granules having a variety of layers of material to produce a host of valuable granules. It will be clear to those skilled in the art that the process is effective for producing a number of different forms of fertilizer and has particular utility with respect to the formation of high grade fertilizer for use on golf courses, etc.

In terms of the binder, suitable example include neutral lignosulfonate of potassium or ammonia, starch, sugars, proteins, water, calcium sulfate, dry glutens, wheat grains, barley grains, rice grains and calcium phosphate among others. The choice of the binder will depend on the desired characteristics of the granule and accordingly, the aforementioned examples are only exemplary.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of granulating compost material, comprising the steps of:

providing a source of dried pulverized compost material in a size distribution of 90% of less than −150 mesh;

forming a moist mixture of dried pulverized compost and binder containing moisture, said mixture containing up to 11% by weight free moisture in said mixture;

mixing said mixture sufficiently to invert the hydrophobicity of said pulverized compost material, where said pulverized compost material absorbs said moisture from said binder and forms a flowable compound;

granulating said mixture into granules on a pan by contact of said mixture with additional binder material and a surfactant; and forming compost granules in a size distribution of 3 mesh to 12 mesh.

2. The method as set forth in claim 1, further including the step of passing formed granules onto a second granulating pan for further accretion of said mixture.

3. The method as set forth in claim 1, wherein said mixture further includes a member selected from the group consisting of sulfur, micronutrients, pH buffers, pH modifiers, bacteria, ion exchanging clay, molecular sieves, fertilizer compounds, fertilizer blends, pesticides, fungicides, minerals and combinations thereof.

4. The method as set forth in claim 1, wherein said binder includes a member selected from the group consisting of gluten, starch, neutral lignosulfonate of ammonia, neutral lignosulfonate of potassium, wheat grains, barley grains, rice grains, lignosol and combinations thereof.

5. A method of granulating compost material, comprising the steps of:

providing a souce of dried pulverized compost material in a size distribution of 90% of less than −150 mesh;

forming a moist mixture of dried pulverized compost and binder containing moisture, said mixture containing up to 11% by weight free moisture;

mixing said mixture sufficiently to invert the hydrophobicity of said pulverized compost material, where said pulverized compost material absorbs said moisture from said binder and forms a flowable compound;

granulating in a first stage said mixture into granules on a pan by contact of said mixture with additional binder material and a surfactant, said granules being in a size distribution of between 3 mesh and 12 mesh;

granulating said granules in said size distribution of between 3 mesh and 12 mesh in a second stage with said mixture and additional binder; and forming compost granules in a size distribution of between −3 mesh and +8 mesh.

6. The method as set forth in claim 5, further including the step of drum granulating said granules in said size distribution of −3 mesh and +8 mesh in the presence of said mixture and binder for formulating granules of ½ inch in size.

7. The method as set forth in claim 5, further including the step of adding an ancillary fertilizer material to said mixture.

8. The method as set forth in claim 7, wherein said ancillary fertilizer is selected from the group consisting of ammonium sulfate, ammonium phosphate, micronutrients, pH buffers, pH modifiers, bacteria, ion exchanging clay, molecular sieves, fertilizer compounds, fertilizer blends, pesticides, fungicides, minerals and combinations thereof.

* * * * *